United States Patent [19]

Neubert et al.

[11] Patent Number: 5,687,483

[45] Date of Patent: Nov. 18, 1997

[54] ELECTRIC HAND TOOL GUIDED WITH TWO HANDS

[75] Inventors: Werner Neubert; Joachim Schadow; Joachim Mueller, all of Stuttgart; Manfred-Otto Staebler, Waldenbuch; Manfred Dohr, Esslingen; Heinz Warkentin, Allmersbach im Tal, all of Germany

[73] Assignee: Robert Bosch GmbH, Stuttgart, Germany

[21] Appl. No.: 538,068

[22] Filed: Oct. 2, 1995

Related U.S. Application Data

[63] Continuation of Ser. No. 189,107, Jan. 31, 1994, abandoned.

[30] Foreign Application Priority Data

Jan. 30, 1993 [DE] Germany .................. 43 02 676.1

[51] Int. Cl.$^6$ .................................................. B25G 1/06
[52] U.S. Cl. .................. 30/312; 16/125; 30/340; 30/518; 30/519
[58] Field of Search .................. 30/518, 519, 312, 30/381, 277.4, 340, 296.1, 392, 525, 276, 382, 383, 384, 385, 386, 387; 16/112, 126, 119, 125; 173/170, 171; 56/12.7

[56] References Cited

U.S. PATENT DOCUMENTS

| 2,462,168 | 2/1949 | Davis | 16/126 |
|---|---|---|---|
| 2,843,164 | 7/1958 | Marsh | 30/383 |
| 3,368,595 | 2/1968 | Gutjahr | 30/340 |
| 3,698,455 | 10/1972 | Frederickson et al. | 30/381 |
| 4,447,953 | 5/1984 | Lombardino et al. | 30/382 |
| 4,757,613 | 7/1988 | Baudreau et al. | 30/382 |
| 4,785,540 | 11/1988 | Arvidsson | 30/381 |
| 4,928,457 | 5/1990 | Laperle | 30/276 |
| 5,005,255 | 4/1991 | Pare et al. | 16/126 |
| 5,070,576 | 12/1991 | Banta | 30/340 |
| 5,168,601 | 12/1992 | Liu | 16/126 |

Primary Examiner—Kenneth E. Peterson
Attorney, Agent, or Firm—Michael J. Striker

[57] ABSTRACT

An electric hand tool guided with both hands has a tool housing, a stationary handle, and an additional movable handle, the additional handle being turnable about a turning axis and being also displaceable longitudinally substantially along the turning axis.

9 Claims, 4 Drawing Sheets

ELECTRIC HAND TOOL GUIDED WITH TWO HANDS

This is a continuation of application Ser. No. 08/189,107 filed Jan. 31, 1994, now abandoned.

BACKGROUND OF THE INVENTION

The present invention relates to an electric hand tool guided with two hands, such as for example a sword saw, a chain saw, hedge clippers and the like.

Electric hand tools of the above mentioned general type are known in the art. In a known electric hand tool of this type a fixed stationary handle is formed usually as a part of the housing and has an on-off switch. In the front region of the tool housing an additional handle is provided and formed as a gripping bracket. The gripping bracket is mounted so that it is turnable between two predetermined positions. Since in known tools the gripping bracket projects uniformly at both sides or at one predetermined side laterally beyond the housing of the tool, it is not possible to perform cuts which are close to walls due to the projecting gripping bracket.

SUMMARY OF THE INVENTION

Accordingly, it is an object of the present invention to provide an electric hand tool to be guided with two hands, such as for example a sword saw, a chain saw, a hedge clipper and the like, with a stationary handle formed as a part of the tool housing and having an on-off switch an additional handle formed as a bracket, releasably mounted on the housing and turnable around its mounting axis as well as fixable in predetermined positions, wherein in accordance with the present invention the gripping bracket is mounted on its mounting or turning axle longitudinally displaceably on the tool.

When the tool electric hand tool is designed in accordance with the present invention, the gripping bracket on the tool is not only turnable in different gripping positions, but also for performing cuts which are close walls is also mounted so that it is longitudinally displaceable on its turning axle relative to the housing of the tool. Thereby both the handling of the tool as well as its utilization are improved.

In accordance with another especially advantageous feature of the present invention, the gripping bracket is displaceable at both sides to an abutment which is formed by the tool housing on the mounting or turning axle, whereby the tool can be well manageable by a left-handed user and a right-handed user.

In accordance with further features of the present invention, the ends of the gripping bracket can be connected in the direction of the turning axle by a part which extends through the tool housing and is longitudinally displaceable by a releasable mounting means.

This part can be formed as a spacer pipe which is substantially closed at both sides and has a flattening with a region received in a flattened tubular opening of the tool and fixable by a releasable clamping device.

Both ends of the gripping bracket can be provided on facing end surfaces with arresting means which are arranged circularly around the turning axle and cooperate with corresponding oppositely formed arresting means on the sides of the spacer pipe inserted between the ends of the gripping bracket.

The ends of the gripping bracket can be placed on the end sides of the spacer pipe with prestress of the gripping bracket.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
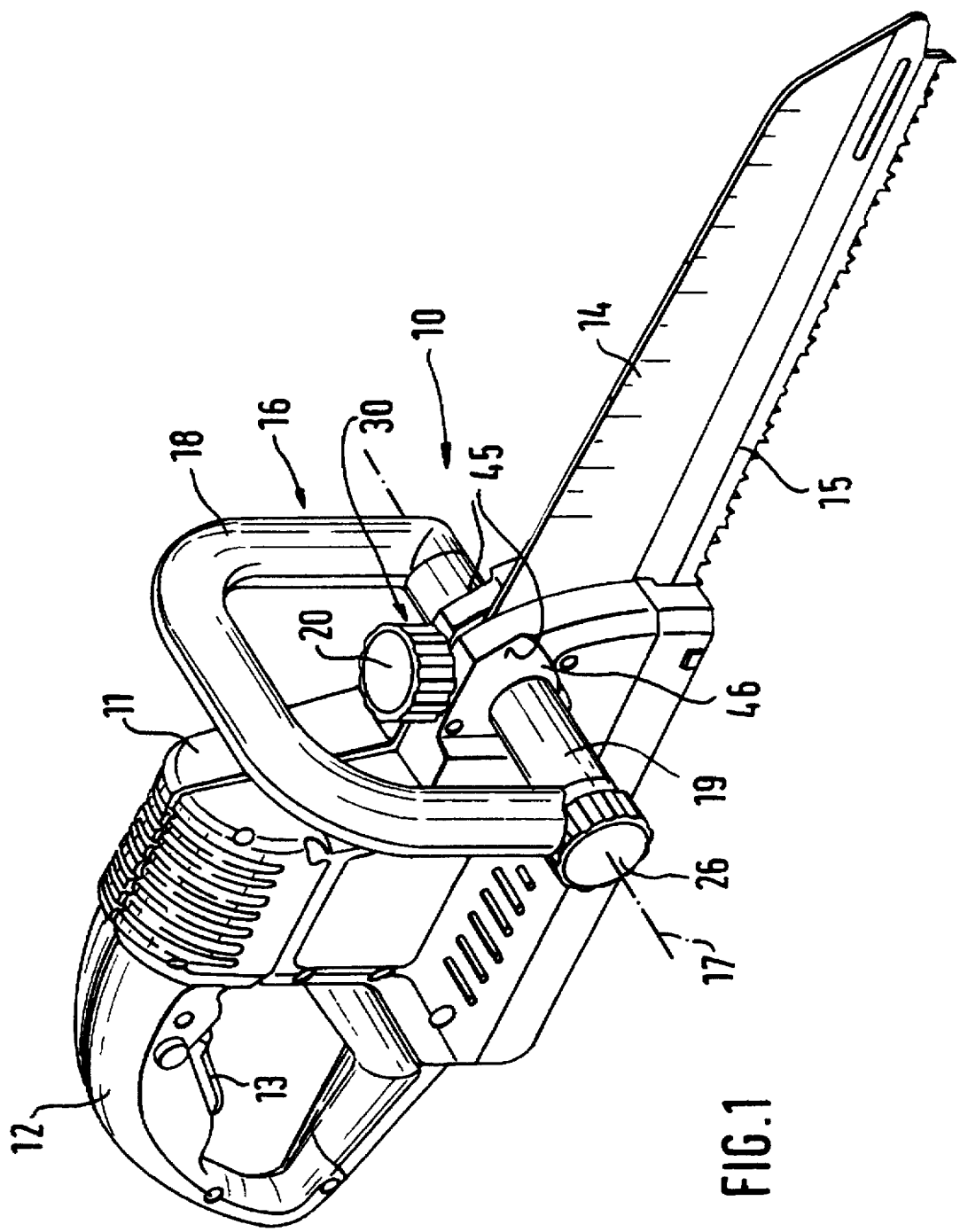
FIG. 1 is a perspective view showing an electric hand tool in accordance with the present invention formed as a sword saw with an additional handle.

An electric hand tool formed as a sword saw for guiding with two hands is shown in FIG. 1 and identified with reference numeral 10. Its drive and transmission are accommodated in a multi-part housing 11 composed of insulating material. The housing has a region which is formed as a handle 12 provided with a switching element 13. The switching element is manually actuatable and used for turning on and off the drive of the tool. A sword 15 is located in the front region of the housing 11 and has a lower side which guides two saw blades 15. The saw blades extend parallel to one another and perform a reciprocating swinging movement in opposite directions. An additional handle 16 is located in the front region of the housing 11. The additional handle 16 is mounted on its turning or mounting axis 17 so that it is independently turnable and longitudinally displaceable relative to the housing 11.

Figure 2:
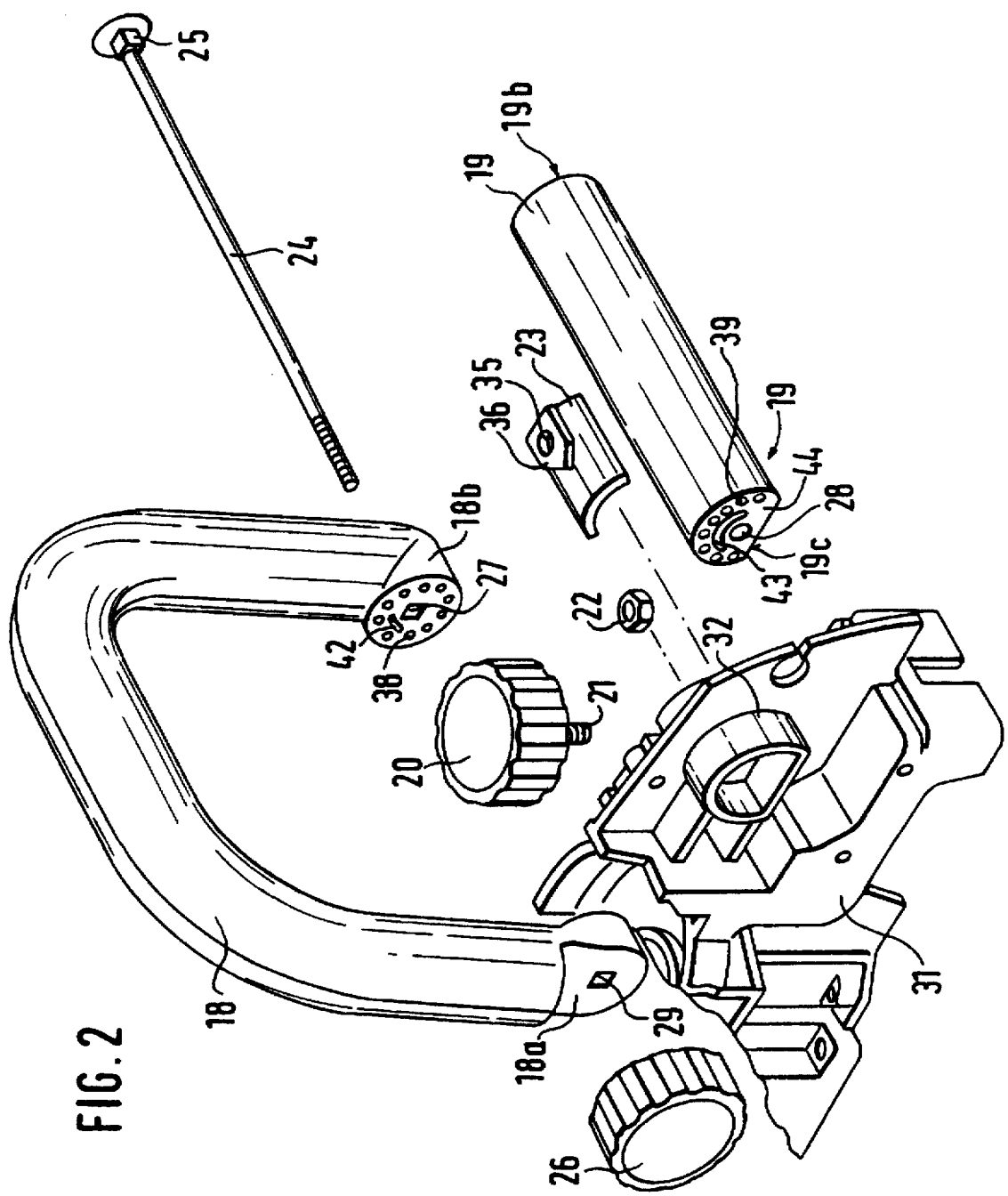
FIG. 2 is an exploded perspective view of individual parts of the additional handle before mounting on the sword saw of FIG. 1.

The additional handle is composed of several individual parts which are shown before their assembly in FIG. 2. These parts include a gripping bracket 18, a spacer pipe 19, a hand wheel 20 with a threaded pin 21, a threaded nut 22 cooperating with a threaded pin 21, a clamping member 23, a flat head screw 24 with a square projection 25, and with a further handle wheel 26 which is screwed on the end of the flat head screw 24. The spacer pipe 19 forms a part which extends in the front region of the housing 11 through the housing and connects ends 18a and 18b of the bracket 18 with one another on the mounting axis 17. The ends 18a and 18b are mounted on end sides 19a and 19b of the spacer pipe 19 with a pretensioning. In the region of the mounting or turning axis 17, one end 18b of the gripping bracket 18 is provided with a square opening for receiving the square projection 25 of the flat head screw 24, which further extends through a longitudinal opening 28 in the spacer pipe 19 and an opening 29 in the other end 18a of the gripping bracket 18. The hand wheel 26 is arranged On the free end of the flat head screw 24 on the correspondingly flattened end 18a of the gripping bracket and releasably clamps the gripping bracket 18 on the spacer pipe 19. The spacer pipe 19 is provided with a flattening 19c in its lower region.

Figure 3:
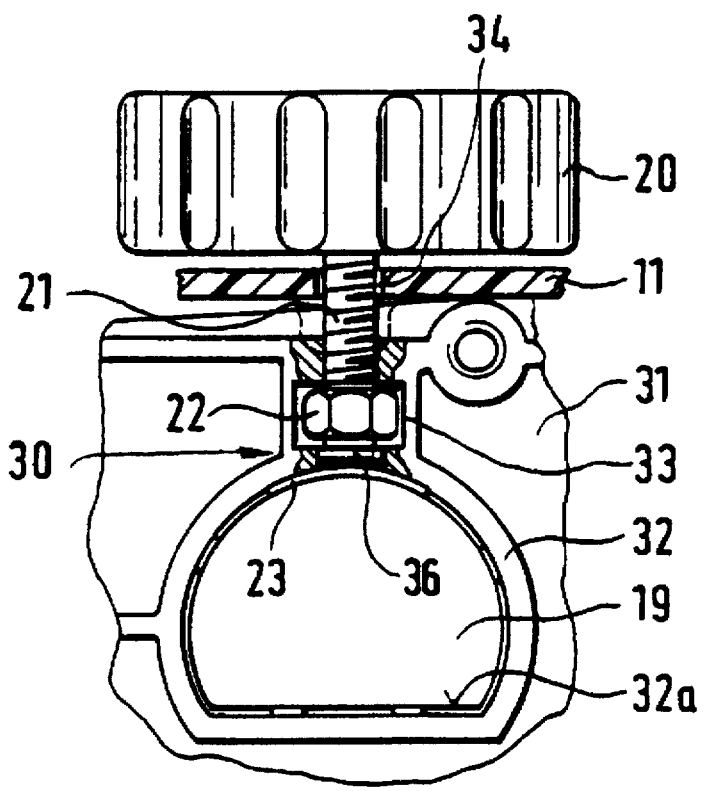
FIG. 3 is a view showing a clamping device for fixing a laterally displaceable spacer pipe of the additional handle on the tool housing.

It can be seen from FIG. 3 that the hand wheel 20 with the threaded pin 21, the nut 22 and the clamping member 23 form a clamping device 30 which is accessible from outside without a tool. The clamping device 30 is received in a collar 32 formed by a transmission housing 31 which is produced by injection molding and adjoins the housing 11. The space pipe 19 is also longitudinally displaceable under the guiding collar 32 which is flattened in its region 32a when the clamping device 30 is released. The clamping member 23 is inserted in the upper peripheral region of the guiding collar 32. The handle wheel 20 with the threaded pin 21 is screwed through a housing opening 34 from outside into the nut 22, extends through an opening 35 of an upwardly bent U-shaped shackle 36 on the clamping member 23, and finally presses the clamping member 23 from the collar 32 of the transmission housing 31 against a corresponding large-surface peripheral region of the spacer pipe 19 inserted in the collar 32.

The spacer pipe 19 is closed at its end sides to the longitudinal opening 28. Arresting means 38 are provided in several predetermined positions on both ends of the gripping bracket 18 on facing end sides 37. They are arranged circularly around the turning axis 17 and cooperate with respectively arranged oppositely formed arresting means 39 provided on the end sides 40 of the spacer pipe 19.

Figure 4:
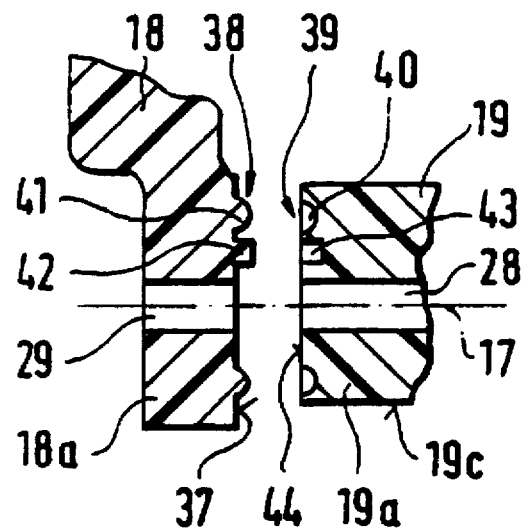
FIG. 4 is a view showing a section through a turnable arresting connection between the gripping bracket and the spacer pipe of the additional handle.

As can be seen from FIG. 4, the arresting means 39 on the end sides 40 of the spacer pipe 19 are formed by semi-spherical recesses 40 which cooperate with corresponding semi-spherical bulges 41 provided on the ends 18a and 18b of the gripping bracket 18 and formed as the arresting means 38. Due to the peripheral distance between the elements of this arresting means 38, 39, different possible turning positions of the gripping bracket 18 are provided. For limiting the turning region of the gripping bracket 18, a cam 42 is formed on the end surfaces 37 and engages in a correspondingly formed, spherical segment-shapes groove 42 on the end sides 44 of the spacer pipe.

Figure 5:
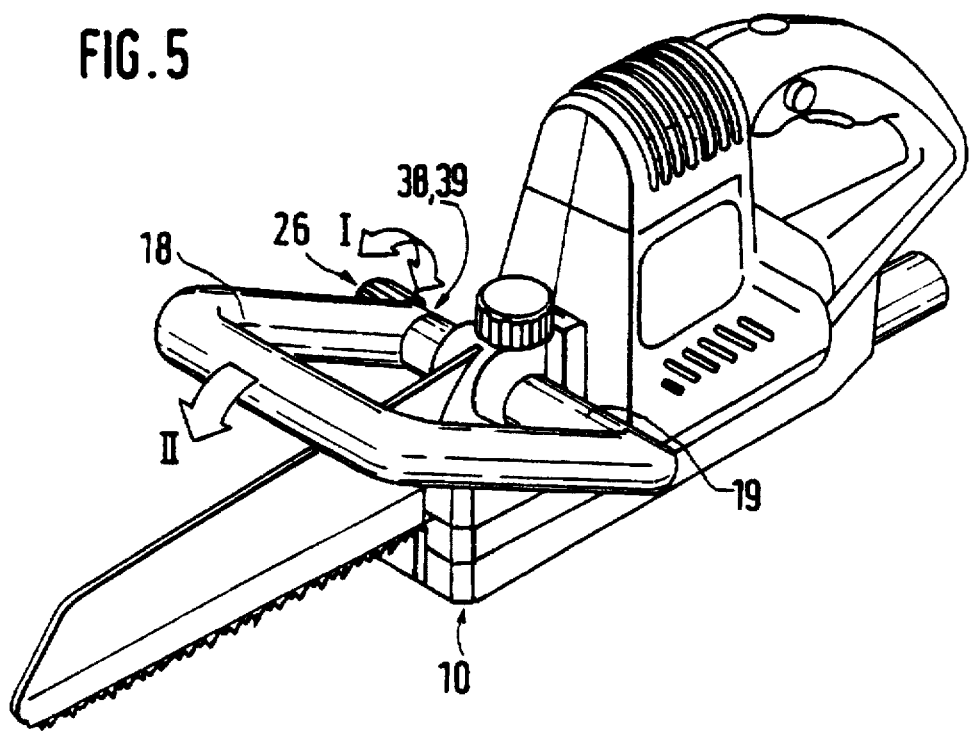
FIG. 5 is a view illustrating the steps for turning the additional handle of the inventive tool.
Figure 6:
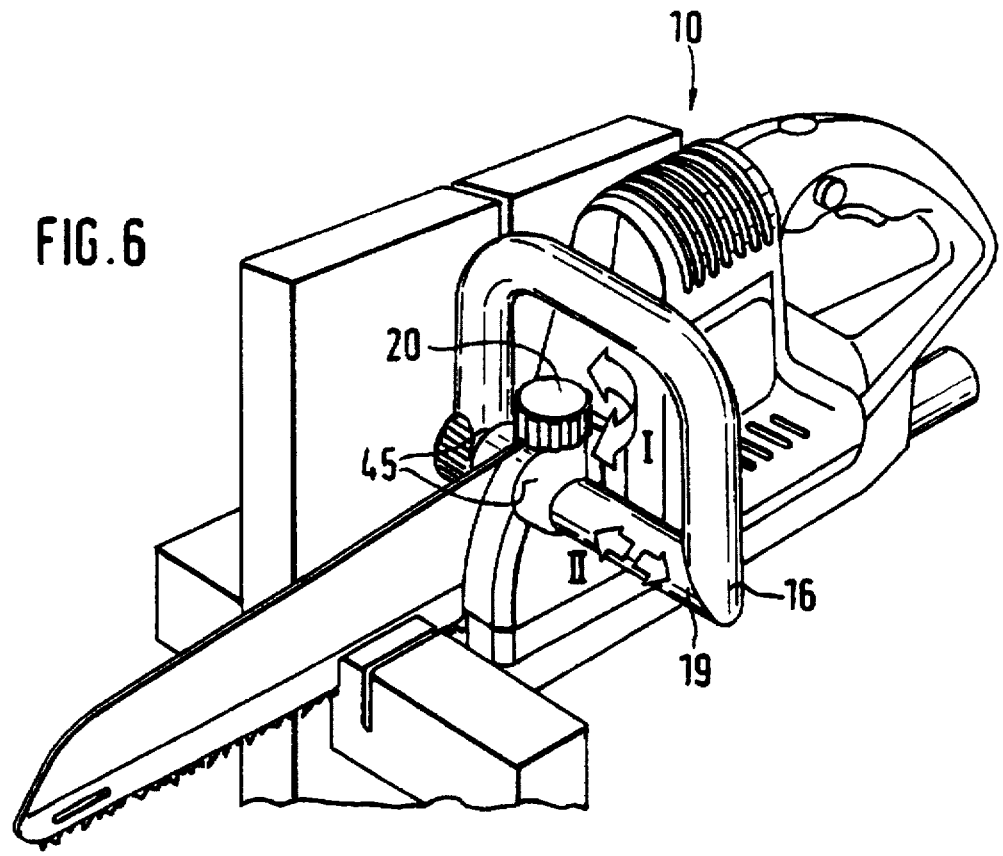
FIG. 6 is a view showing the steps for a lateral displacement of the additional handle of the inventive tool.

FIGS. 5 and 6 illustrate the adjustment of the additional handle 16 or the gripping bracket 18. A turning of the gripping bracket 18 to a position provided by the arresting means 38, 39 is performed in the following manner. First, the handle 26 is turned in a counterclockwise direction and thereby the flat head screw 24 is released and the axial pretensioning produced by the pretensioning of the gripping bracket 18 is removed. Due to this axial pretensioning an arrestable turning movement of the gripping bracket 18 is performed until the cam 42 on the gripping bracket 18 correspondingly abuts at the end of the groove 43 on the spacer pipe 19. In each arresting position which is obtained in this manner, the handle wheel 26 is again tightened and thereby the gripping bracket 18 is fixedly clamped in the adjusted position with the spacer pipe 19. The flattening 19c on the lower side of the spacer pipe 19, which is placed in a corresponding flattening 32a on the guiding collar 32 of the transmission housing 31, prevents a turning of the spacer pipe 19 on the sword saw 10.

A lateral displacement of the additional handle 16 is performed in the following manner. First, with the handle wheel 20 inserted in the sword saw the clamping part 23 on the spacer pipe 19 is released. The gripping bracket 18 can be longitudinally displaced in a stepless manner along its axis 17 together with the spacer pipe 19 to both sides until an abutment 45 formed by the housing 11 of the sword saw 10. The abutments are provided in a housing depression 46 which can be seen in FIG. 1 and in which the gripping bracket 18 can be introduced. Thereby the sword saw 11 can make cuts which are close to walls, so that at the same time the outer contour of the additional handle 16 does not project outwardly beyond the width of the housing 11.

It will be understood that each of the elements described above, or two or more together, may also find a useful application in other types of constructions differing from the types described above.

While the invention has been illustrated and described as embodied in an electric hand tool guided with both hands, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An electric hand tool guided with both hands, comprising a tool housing; a stationary handle; and an additional movable handle, said additional handle being turnable about a turning axis and being also displaceable longitudinally substantially along said turning axis, said additional handle being formed as a gripping bracket having two opposite ends, and having a member which extends through said tool housing substantially along said turning axis and connects said ends of said gripping bracket with one another, said member being formed as a spacer pipe which is substantially closed at its both ends and provided with a flattening having a region which is received in a respective flattened tubular opening; and an outwardly releasable clamping device fixing said region of said flattening.

2. An electric hand tool as defined in claim 1; and further comprising a transmission housing in which said flattened tubular opening is formed, said clamping device including a clamping member extending over a peripheral region into said transmission housing, and a handle wheel arranged on said tool housing and pressing said clamping member against said spacer pipe.

3. An electric hand tool as defined in claim 1; and further comprising arresting means for arresting said gripping bracket in a plurality of turning positions, said arresting means including a plurality of first arresting members arranged on end surfaces of both ends of said gripping bracket circularly around said turning axis, and a plurality of second opposite arresting members arranged on end sides of said spacer pipe which is inserted between said ends of said gripping bracket and cooperating with said first arresting members.

4. An electric hand tool as defined in claim 3, wherein said bracket has a flattened end; and further comprising means for connecting said ends of said gripping bracket with said spacer pipe and including a screw extending substantially along said turning axis and connecting said ends of said gripping bracket with said spacer pipe so that they cannot rotate relative to one another and also having a free end extending outwardly beyond said flattened end of said gripping bracket, and a hand wheel screwed on said free end of said screw and releasably clamping said gripping bracket on said spacer pipe.

5. An electric hand tool as defined in claim 3, wherein said first arresting members and said second arresting members are formed as cooperating semi-spherical bulges and recesses.

6. An electric hand tool as defined in claim 5, said semi-spherical recesses are provided on said end surfaces of said spacer pipe, while said semi-spherical bulges are provided on said ends of said gripping bracket, said semi-spherical recesses and said semi-spherical bulges being arranged at distances from one another in a circumferential direction around said axis.

7. An electric hand tool as defined in claim 3; and further comprising means for limiting a turning region of said gripping bracket, said limiting means including cams provided on said end surfaces of said ends of said gripping bracket, and circular segment shaped grooves provided on said end sides of said spacer pipe and formed so that said cams engage in said grooves.

8. An electric hand tool as defined in claim 3, wherein said ends of said gripping bracket are placed on said end surfaces of said spacer pipe with a prestress of said gripping bracket.

9. An electric hand tool guided with both hands, comprising a tool housing; a stationary handle; an additional movable handle, said additional handle being formed as a gripping bracket which is turnable about a turning axis between a plurality of gripping positions and displaceable along said turning axis between a plurality of further gripping position to be gripped by a user in each of the gripping positions for use of the electric hand tool; abutment means arranged so that said gripping bracket is displaceable along the turning axis relative to said tool housing until a point of said gripping bracket abuts at least at one side against said abutment means, said gripping bracket having two opposite ends, said additional handle also having a member which extends through said tool housing substantially along said turning axis and connects said ends of said gripping bracket with one another, said gripping bracket being releasably connected with said tool housing; and means which releasably clamp said bracket when it is connected with said housing and which is actuateable from outside of said housing and said bracket, said means clamping said gripping bracket on said member.

* * * * *